United States Patent [19]

Day

[11] 4,098,037
[45] Jul. 4, 1978

[54] ROOF MUFFLER
[75] Inventor: Leon E. Day, Hughes, Ark.
[73] Assignees: Jeff Pratt; George G. Watts, both of Memphis, Tenn.
[21] Appl. No.: 677,740
[22] Filed: Apr. 16, 1976
[51] Int. Cl.$^2$ .............................................. E04B 7/00
[52] U.S. Cl. .......................................... 52/23; 52/149; 52/DIG. 11
[58] Field of Search .................... 52/23, 146, 148, 149, 52/DIG. 11; 248/361 A; 280/179 A
[56] References Cited

U.S. PATENT DOCUMENTS

| 2,933,165 | 4/1960 | Rose | 52/149 |
|---|---|---|---|
| 3,309,822 | 3/1967 | Dunkin | 52/23 |
| 3,691,703 | 9/1972 | Barnes | 52/23 |
| 3,757,475 | 9/1973 | Hackworth | 52/23 |
| 3,871,142 | 3/1975 | Abbott | 52/23 |

Primary Examiner—J. Karl Bell
Attorney, Agent, or Firm—Robert H. Elliott

[57] ABSTRACT

This invention is directed to and for use on mobile homes. The primary function of the structure is reduce and minimize roof rumble when the mobile home is exposed to natures turbulent forces. The structure consists of a pair of generally L shaped brackets, one bracket disposed at the intersection of each of the sidewalls with the roof. A connecting member is interposed between each of the L shaped brackets and fitted with means for maintaining said connecting member in substantial contact with the roof of the said mobile home, thus reducing and minimizing roof displacement which causes the rumble.

4 Claims, 5 Drawing Figures

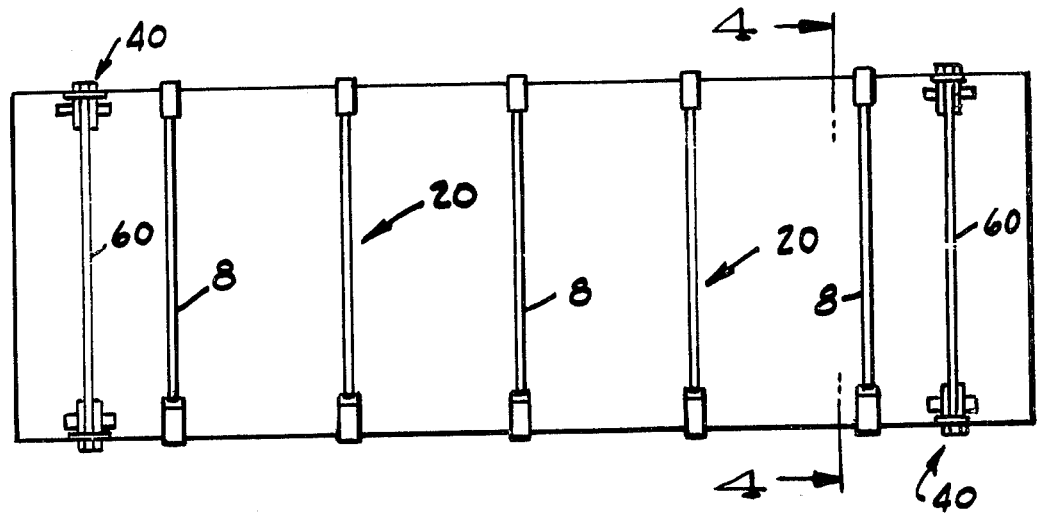
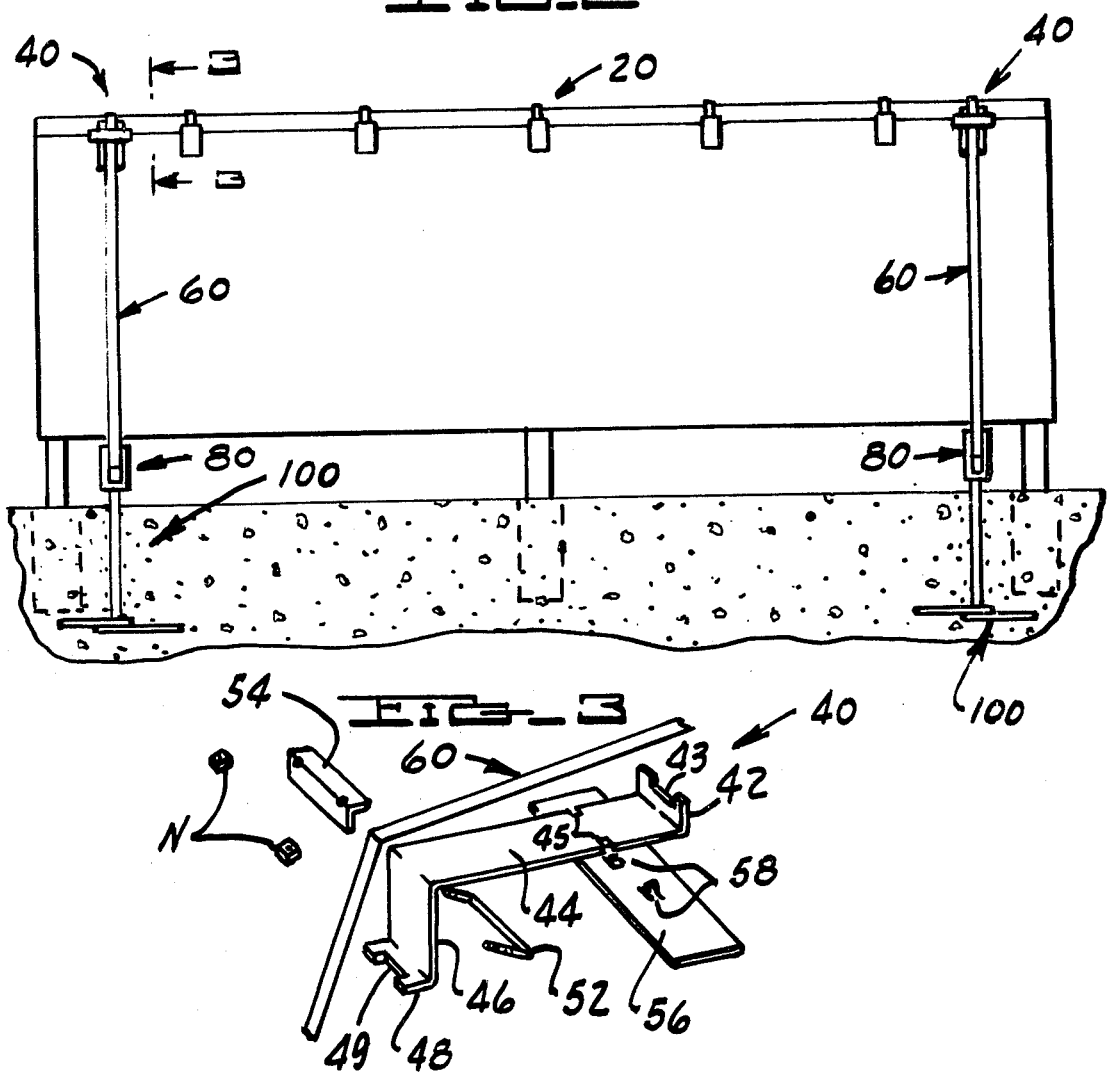

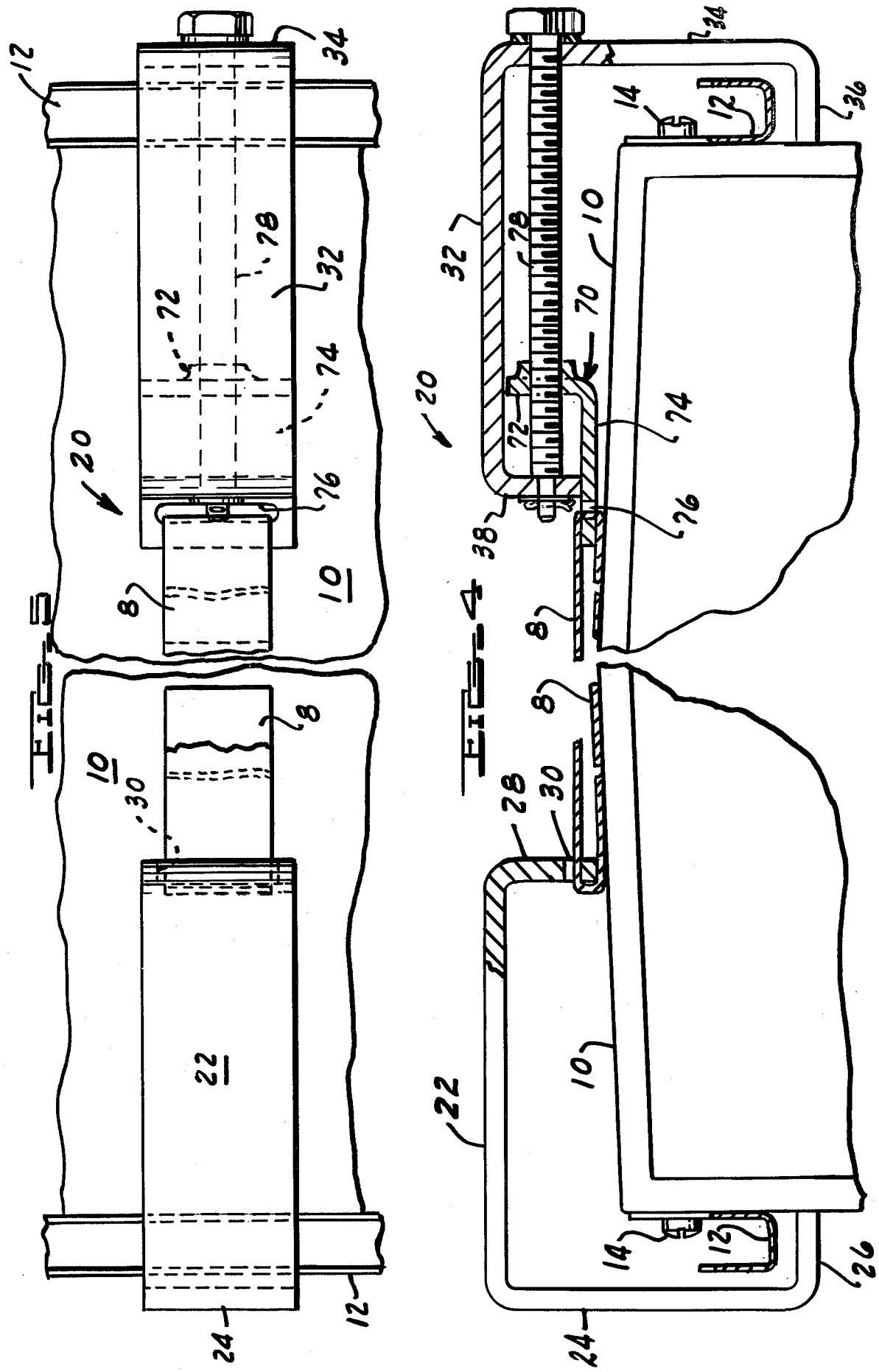

ROOF MUFFLER

BACKGROUND OF INVENTION

While the above described problem has been with the mobile home people for many years, to date no satisfactory solution to this problem was known. However, with the advent of the proposed invention, the solution appears to be at hand and applicable to most mobile homes without modification. The solution is effective, can be readily applied and is moderate in cost.

AREA OF SEARCH

The area of search in the United States Patent Office is in Class 52, Sub Classes 23, 148 and 146, in Class 248, Sub Class 361 A and in Class 280, Sub Class 179 A, while typical United States Patent are identified as follows:

U.S. Pat. No. 1,864,403 — Bradley: June 21, 1932
U.S. Pat. No. 2,353,017 — Denton: July 4, 1944
U.S. Pat. No. 3,054,151 — Shankland: Sept. 18, 1962
U.S. Pat. No. 3,335,531 — Grimelli, et al.: Aug. 15, 1967
U.S. Pat. No. 3,726,054 — Anderson, et al.: Apr. 10, 1973

IN THE DRAWINGS

FIG. 1 of the drawings illustrates a top plan view of a mobile home with the proposed invention secured thereto.

FIG. 2 is a side elevation of the mobile home shown in FIG. 1 of the drawings, including hold downs and anchors.

FIG. 3 illustrates a hold down bracket structure.

FIG. 4 is a side view of the structure shown in FIG. 1, along lines 4—4 thereof, partially broken away.

FIG. 5 is a plan view of the enlarged structure shown in FIG. 4.

Before explaining the proposed invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and/or terminology employed herein is for the purpose of description and not of limitation.

It will be recognized from the drawings of the proposed invention that the invention is simple, durable and can be installed by non-skilled help without damage to the mobile home. When the structure is properly installed, it will function to reduce and minimize roof rumble, a current problem of substantial magnitude.

It will be observed from FIGS. 1 and 2 that the roof—muffler assemblies are positioned in substantially equidistant spaced relationship. Each of said roof-muffler assemblies are identified by the numeral 20, while the hold down bracket assemblies are disposed at each end of the mobile home and are identified by the numeral 40. The strap portion 60 of the hold down is secured at each end in an adjustable bifurcated end 80 of an earth anchor 100. It will also be noted that the mobile home is mounted on vertical members which are supported in the ground on cement piers or other such foundation and may be skirted for decoration.

The hold down assembly 40 is illustrated in its disassembled condition for ease of description. The roof bracket 56 is generally flat and of rectangular configuration, although it could be of other suitable shape. Centrally positioned therein are two tabs 58 which are struck from the body of the roof bracket 56 which are cooperable with a pair of cut-outs 45 located on the edge of the generally horizontal body 44. The right end 42 of the body 44 is disposed at substantially right angles thereto and has a centrally positioned notch 43 on its outermost end. The left end of the body 44 has a downturned portion 46 which is disposed in generally parallel relationship to the opposite end 42. Extension 48 on the downturned portion 46 is disposed in generally parallel relationship with the body portion 44. The angle which defines portions 44 and 46 has a threaded end U-shaped bracket which slops over the outside of the body 44, with the threaded ends thereof being cooperable with the openings 55 in the angle bracket 54, with the strap 60 disposed therebetween. Compression of the strap 60 over the defined angle between 44 and 46 when the angle bracket 54 is drawn down by the nuts "N" clamps the strap 60 in proper position when corresponding portions are guided in the respective notches 43 and 49. Each end of the strap 60 is secured in adjustable relationship at each respective corner, with each earth anchor 100 disposed in the ground. Adjustable means such as a slotted shaft are provided in the bifurcated and portion 80 of each respective earth anchor 100.

Looking now at FIGS. 4 and 5, it is noted that the L-shaped bracket at the left is of unitary construction and has a generally horizontal body 22, a portion of which is turned downwardly so as to form a generally vertical portion 24. The end of the vertical portion 24 is formed inwardly at 26 to form a foot which engages the vertical wall of the mobile home. The opposite end is turned downwardly at 28 and has a slotted portion 30 disposed therein. The foot 26 is of such dimension as to permit the drip rail 12, which is secured to the sidewall by screws 14 to be protected against crushing or damage when the roof muffler is installed. The horizontal slot 30 in the downturned end 28 has positioned therein the connector strap 8, which is bent over upon itself for a distance of 18 inches or more, thus preventing same from being drawn through the slot 30 when the roof muffler is secured in position.

The bracket on the right is generally the same, but does have a number of differences. The horizontal body 32 has a downturned portion 34 integral therewith, which has a foot 36 thereon which engages the sidewall of the mobile home. It is designed in the same manner as is foot 26 on the opposite side and for the same reasons. The left end of the body 32 is turned down at 38 and has a centrally positioned pilot opening therein adapted to receive the cylindrical end of the bolt 78 which is disposed therein and secured therein by means of a washer and cotter key. The bolt 78 is cooperable with the slotted right angle bracket 70. The upturned end portion of bracket 70 has a threaded portion 72 therein which is cooperable with bolt 78, while the body 74 has a sloted portion 76 therein. Thus, when the connector strap 8 is disposed therein and turned under itself for approximately eighteen inches, it will then be apparent that when the bolt 78 is rotated, a tension will be created in the strap drawing it against the roof of the mobile home in such a manner that the connector strap will be in almost total contact with the roof, less the length of the respective brackets. Such construction will thus prevent the roof members from displacement when exposed to the elements, such as wind. While a metal connector strap 8 is illustrated, a fabric element could be used, as could a resilient member, without departing from the spirit and scope of the invention. Additionally, an adjustable bracket could be substituted for the unitary bracket on the left hand side. Likewise, should trouble be encountered with the feet 26 and 36 damaging the sidewalls of the mobile home the foot portions thereon can be enlarged to avoid this problem or a separate plate similar to that of 56 on the hold down could be employed without departing from the invention.

Thus, the roof muffler of the present invention incorporates the use of a set of generally L-shaped brackets having legs disposed in substantial right angle relationship, with the outermost ends thereof being squared off and deformed in generally parallel relationship to each of the leg portions, one of said set of L-shaped brackets is in the form of a multi-part assembly wherein aligned openings are found in the squared off deformed end of one leg portion as well as in the adjacent leg portion, while positioned between said aligned openings is still another L-shaped bracket with two legs, one leg having an elongated slot therein on the outermost squared end thereof, while the other leg disposed at substantially right angles thereto has a centrally positioned threaded opening therein which is located in substantial alignment with the aligned openings in the first described L-shaped bracket, while a threaded member is positioned within each of said openings so that rotation of the threaded member will cause displacement of the L-shaped bracket member located thereon, the second bracket of said set may be the same as above described so that adjustment of a connecting strap member disposed therebetween can be adjusted from either side, of course, the bracket may be of unitary structure and have an elongated slot located in the squared end of one of the deformed portions of the leg, each of said elongated slots in said brackets having positioned therein the ends of the connector strap, the ends of which are bent over and disposed beneath said strap so that rotation of the threaded member functions to tension said connecting strap member when the hook portion of each of the L-shaped brackets is in contact with the vertical opposed side-walls of the mobile home.

From the foregoing, it will be apparent that the proposed invention is simple, durable and can be readily installed by non-skilled help in a minimum of time, without damage to the structure on which it is used, whether it be a mobile home or other type structure which has the same or similar problem.

Having thus described my invention, I claim:

1. In a vibration dampner for the reduction of roof rumble in a mobile home, the combination of,
   a set of generally L-shaped brackets having a first leg portion and a second leg portion, with each of said first and second leg portions being disposed at substantially right angles to each other;
   the outermost squared end of the first leg portion is deformed to underlie the second leg portion in generally parallel relationship, thus forming a spacing foot structure which engages the vertical sidewall of the mobile home immediately beneath a drip-rail-;
   the outermost squared end of the second leg portion is deformed to lie in generally parallel relationship to the first leg portion;
   the first "L" shaped bracket of said set is of unitary construction and has an elongated slot in generally parallel relationship to the deformed portion on the outermost squared end of the second leg portion, while the second L-shaped bracket of the set is in the form of a multi-part assembly and has a first centrally positioned opening in the deformed portion on the outermost squared end of the second leg portion, as well as a second opening in the first leg portion, which second opening is disposed in alignment therewith;
   intermediate the first leg portion and the outermost squared end of the second leg portion is positioned another L-shaped bracket having two legs, one leg having an elongated slot therein on the outermost squared end thereof, while the other leg has a centrally positioned threaded opening therein which is in substantial alignment with the first opening in the outermost squared end of the second leg portion, as well as the second opening in the first leg, when the squared end thereof is positioned adjacent the underside of the second leg portion;
   a threaded member secured within each of said openings;
   and a connecting member secured between said first unitary bracket member and said second "L" shaped bracket assembly when said L-shaped bracket members are positioned against the vertical side walls of the mobile home;
   rotation of said threaded member functioning to tension said connecting member by drawing same into contact with the roof of the mobile home so as to reduce roof panel displacement when said roof is exposed to the wind.

2. A structure as in claim 1, wherein the connecting member is a metal strap of greater length than the width of the mobile home, thus when the ends of the metal strap are formed and positioned in their respective elongated slots and bent over upon themselves, tensioning of the strap makes the complete assembly functional.

3. A structure as in claim 1, wherein a plurality of roof muffler assemblies are disposed in pre-determined spaced relationship throughout the length of the mobile home.

4. A structure as in claim 1, wherein the roof muffler when assembled on a mobile home extends only to a point immediately beneath the drip-rail, with the deformed portion of the squared end of the leg functioning to prevent deformation of the said drip-rail.

* * * * *